March 12, 1929.  J. L. WHEELER  1,705,164
LENGTH INDICATING MECHANISM FOR FABRIC MEASURING MACHINES
Filed Feb. 10, 1923  4 Sheets-Sheet 2
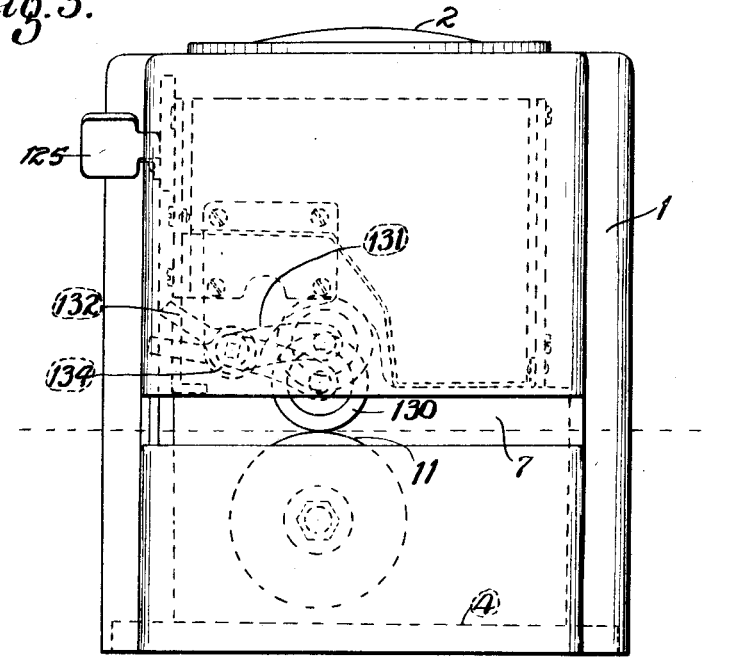
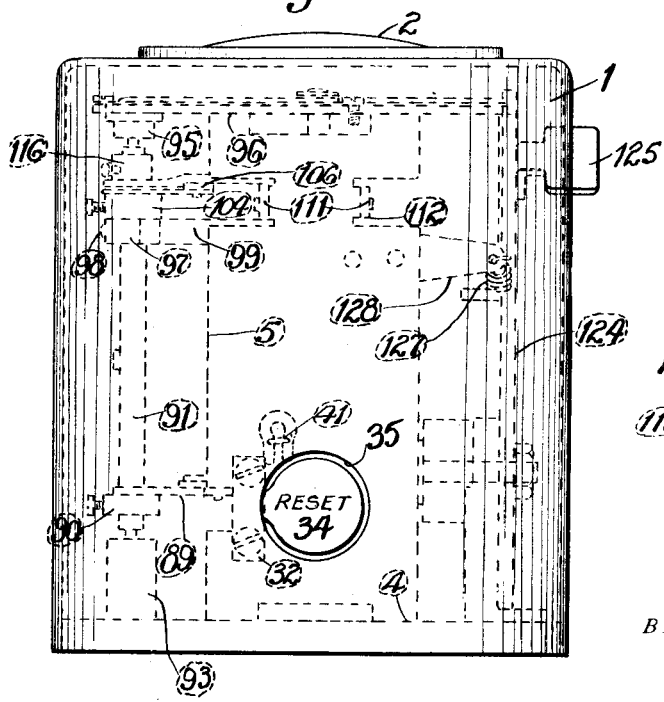
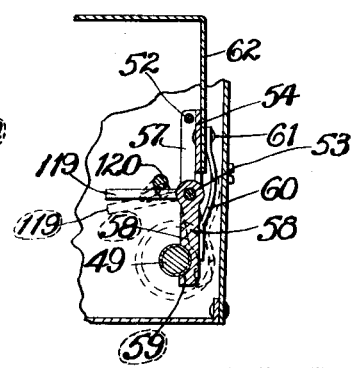
INVENTOR
John L. Wheeler
BY
ATTORNEY March 12, 1929.  J. L. WHEELER  1,705,164
LENGTH INDICATING MECHANISM FOR FABRIC MEASURING MACHINES
Filed Feb. 10, 1923  4 Sheets-Sheet 3

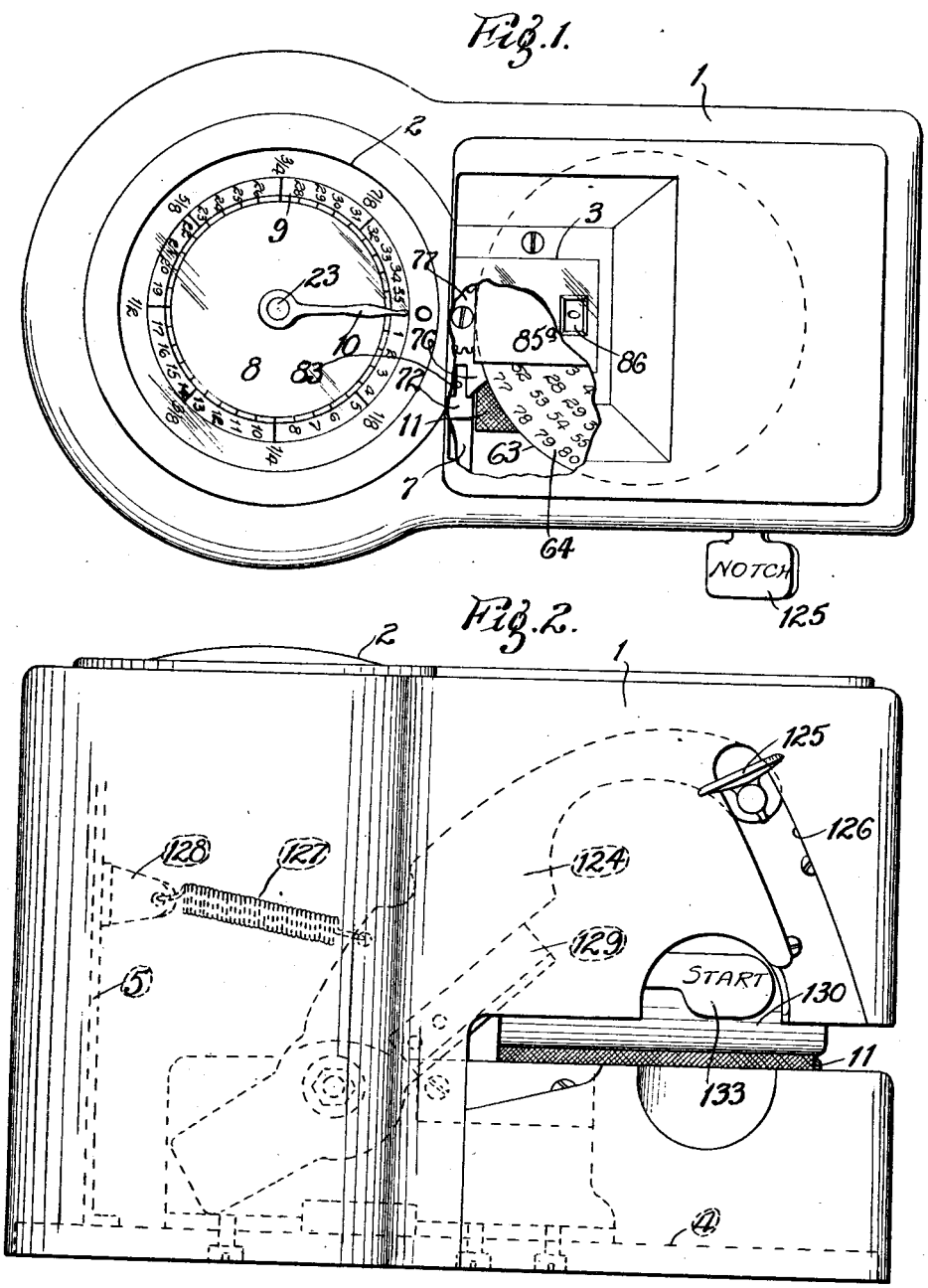

INVENTOR
John L. Wheeler
BY *Bruce S. Elliott*
ATTORNEY

March 12, 1929.  J. L. WHEELER  1,705,164
LENGTH INDICATING MECHANISM FOR FABRIC MEASURING MACHINES
Filed Feb. 10, 1923      4 Sheets-Sheet 4
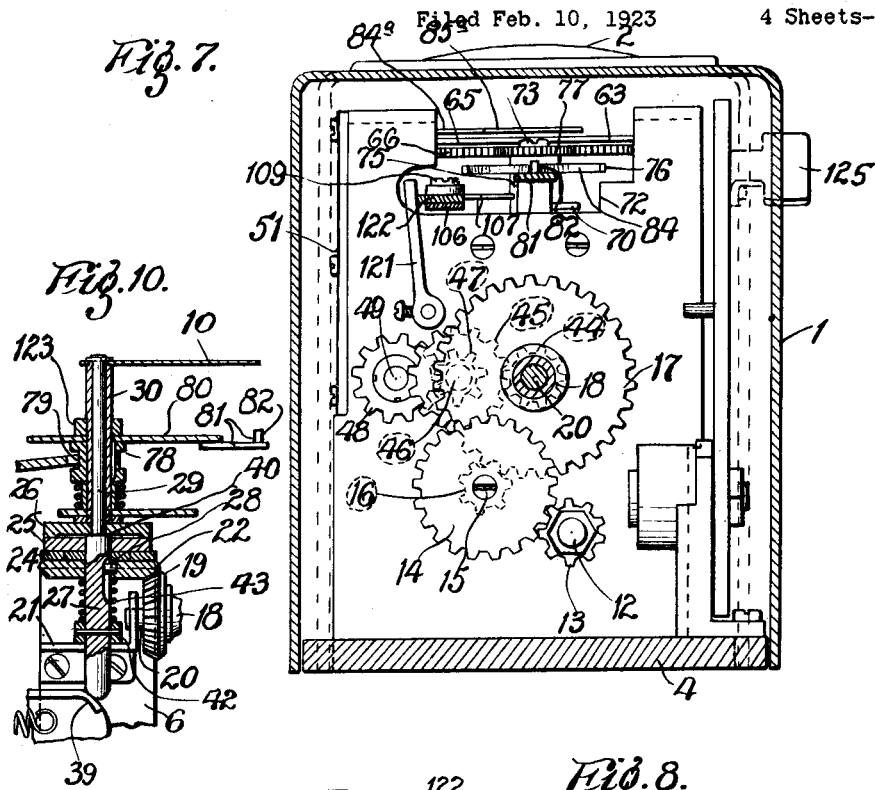
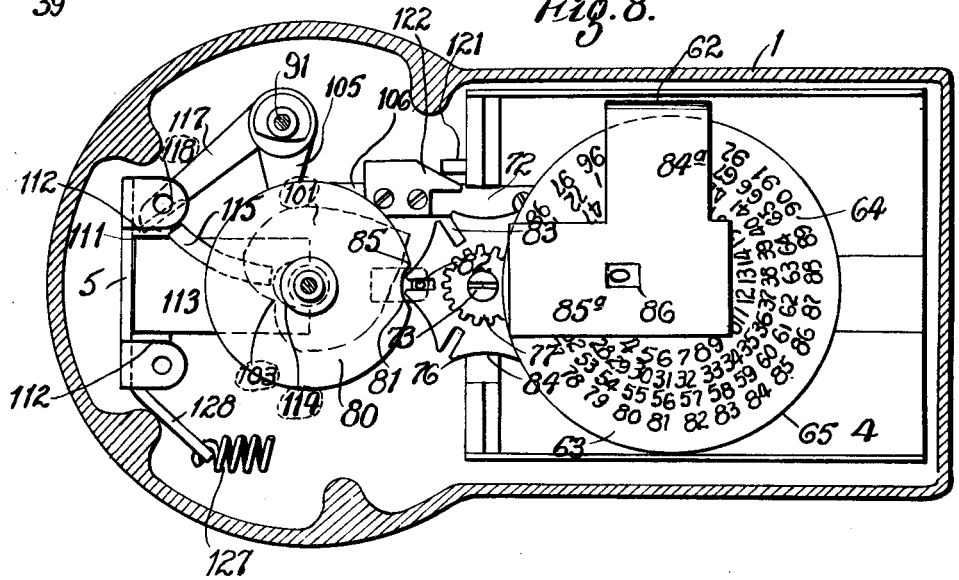
INVENTOR
John L. Wheeler
BY Bruce S. Elliott
ATTORNEY Patented Mar. 12, 1929.

1,705,164

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

LENGTH-INDICATING MECHANISM FOR FABRIC-MEASURING MACHINES.

Application filed February 10, 1923. Serial No. 618,189.

This invention relates to fabric measuring machines of the type intended more particularly for use in making measurements of great extent, as in wholesale operations, or in stock-taking, the latter involving the measurements of bolts or pieces of fabric of various kinds and of various lengths.

The general object of the invention is to provide improved means to indicate the total number of complete yards of material passed through the machine up to, say, one hundred yards, in a single measurement, and to combine therewith a unit-of-measure indicator, such as a yard indicator, suitably subdivided to indicate various divisions of the unit of measure, whereby in any given measurement the one indicator will show the total number of whole yards in the piece of fabric measured, and the other will show any fractional part of a yard, or any number of inches.

A further general object of the invention is to provide means for returning both indicators to the zero position in a single operation.

Other objects of the invention relate to details of construction and combinations and operations of parts involved in the attainment of the above stated general objects of the invention.

With these objects in view, the invention comprises a unit-of-measure indicator, preferably in the form of a dial having a hand continuously movable thereover, which is rotated by the passage of the goods over a measuring roller, and a total measurement indicator which is operated from the measuring roller in unison with the unit measurement indicator and which is subdivided to show yard measurements from one to, say, one hundred yards. The unit-of-measure indicator operates continuously in the measuring operation and the mechanism for operating the total measurement indicator is arranged in such manner that at the completion of a cycle of movement of the unit-of-measure indicator, or in other words, at the completion of each rotation of the hand over the dial, the total measurement indicator will be advanced to indicate a measurement of a yard, so that at the completion of the measuring operation the total length of the fabric measured will be shown on the respective dials by yards and fractions of a yard, or inches. The movement of the indicators is continuous up to the capacity of the machine, or to the end of any given measuring operation involving less than one hundred yards, and means are provided for releasing the operative connection of the indicators from the driving mechanism at the will of the operator and for returning the indicators to the zero position. Included in the driving mechanism for the indicators is a clutch and a Geneva movement mechanism for rotating one member of the total measurement indicator in stages; and means are provided for releasing the clutch and for disengaging the two members of the Geneva movement mechanism in the resetting operation.

A preferred embodiment of the invention is shown in the accompanying drawings in which—

Figure 1 is a plan view of a machine constructed according to my invention, a part of the casing being broken away to better illustrate the arrangement of certain parts within the machine;

Figure 2 is a view in side elevation of the same;

Figure 3 is a view in front elevation;

Figure 4 is a view in rear elevation;

Figure 7 is a cross-sectional view taken on the line 7—7 of Figure 5;

Figure 8 is a horizontal sectional plan view taken on the line 8—8 of Figure 5;

Figure 9 is a fragmental cross-section taken on the line 9—9 of Figure 6 and viewed in the direction of the arrows; and Figure 10 is a vertical sectional view through the clutch mechanism and connected parts shown at the left of Figure 5.

Figure 5:
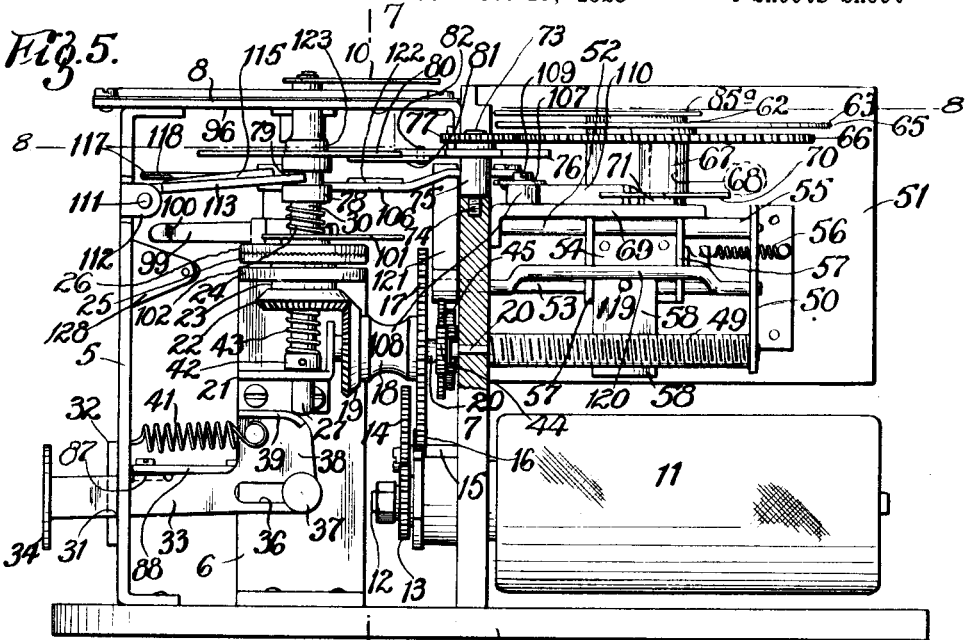
Figure 5 is a view in side elevation partly in section, with the casing of the machine removed.
Figure 6:
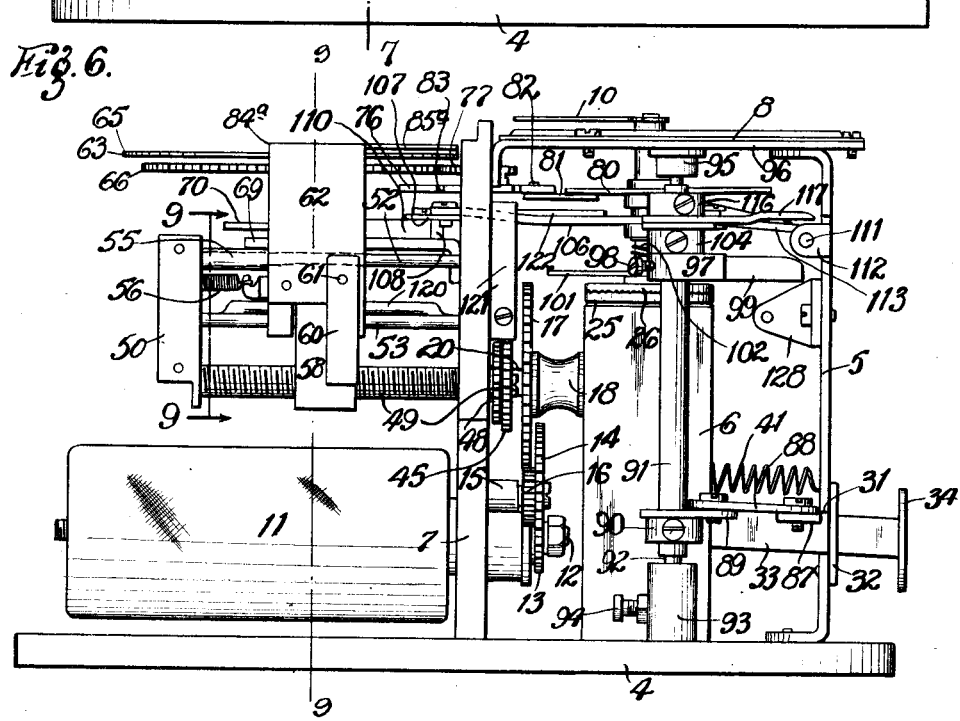
Figure 6 is a view similar to Figure 5 but viewed from the opposite side of the machine to that shown in Figure 5.

Referring now to the drawing, the numeral 1 indicates a casing, the top of which is provided with a circular glass covered opening 2 and adjacent thereto is a rectangular glass covered opening 3. The casing 1 is adapted to enclose the working parts of the machine, which, as shown by Figures 5 and 6, are mounted on a base plate 4 through the medium of frame members 5 and 6, and a vertical partition 7 located about centrally of the base plate 4. The inner frame of the machine has mounted on its upper side a circular dial 8 (Figure 1) which is located immediately under the window 2, which dial is provided with a circularly arranged series of numbers 9 indicating inches and surrounding these numbers with a circularly arranged series of fractions to indicate the usual fractional divisions of a yard, such as one-eighth, one-fourth, three-eighths, one-half, etc. Mounted to rotate over this dial is a hand 10 which is operated through the mechanism which will now be described, referring particularly to Figures 5, 6 and 7.

Rotatably mounted at one end in the lower part of the partition 7 is a measuring roller 11, the shaft 12 of which is provided on its inner end with a pinion 13 meshing with a gear 14 mounted on a stub shaft 15. Fast on the gear 14 is a pinion 16 which meshes with a relatively large gear wheel 17 mounted on one end of a sleeve 18 which at its other end carries a bevel gear 19. The sleeve 18 is rotatably mounted on a stub shaft 20 which is secured at one end in a vertical portion of a bracket plate 21 and at its other end in the partition 7. The bevel gear 19 is in mesh with a similar bevel gear 22 which is mounted on the lower end of a sleeve 23 rotatably mounted in a bracket plate 24 provided at the upper end of the frame member 6. The sleeve 23 has secured to its upper end a clutch member 25 which co-operates with a companion clutch member 26. The sleeve 23 with the bevel gear 22 and clutch member 25 is splined on a vertically disposed shaft 27, as indicated at 28 in Figure 10, the lower end of said shaft being rotatably and slidably mounted in a horizontal portion of the bracket plate 21, as shown in Figure 5, the intermediate portion of the shaft being journaled through the medium of the sleeve 23 in the bracket plate 24. The upper end portion of shaft 27 is reduced in diameter, as indicated at 29 in Figure 10, and mounted on this reduced portion is a sleeve 30 which has secured at its lower end the clutch member 26 previously referred to. The hand 10 is mounted on the upper end of the sleeve 30. With the parts as thus organized and the clutch members 25 and 26 in engagement, it will be seen that with the rotation of the measuring roller 11, the hand 10 will be rotated and the relation of the chain of gearing from the measuring roller 11 to the bevel gear 22 is such that the hand 10 will be moved a distance equivalent to one-eighth of the circumference of the circular dial 8 for every complete revolution of the measuring roller, the latter having a circumference of four and one-half inches, or one-eighth of a yard.

In the operation of the machine, the clutch members 25 and 26 are adapted to be separated to permit the hand 10 and the elements of the total yards indicator, to be described, to return or be returned to the zero position. In the present embodiment of the invention I prefer to separate the cam members by raising the member 26. This is effected by the following mechanism, referring to Figures 4, 5 and 6.

Slidably mounted in a slot 31 in the frame member 5 and held therein by a plate 32 secured on said frame member, is a slide bar 33 having on its outer end a button 34 which is accessible through an opening 35 provided in the rear end of casing 1. The inner end of the slide bar 33 is provided with a slot 36 which works over a headed stud 37 secured in the frame member 6. The bar 33 is further provided at its inner end with an upwardly projecting portion 38 which is provided at its upper end with a cam plate 39 adapted to engage under the lower end of the shaft 27. The button 34 is known as the "reset" button, and when in its outward position, as shown in the drawings, its cam portion is withdrawn from lifting engagement with the end of the shaft 27. When the reset button 34 is pushed inward, however, the cam plate 39 will move under the end of the shaft 27 and raise it, and, through the medium of the shouldered portion 40 of said shaft, made by producing the reduced portion 29 (Figure 10) engaging the lower end of the sleeve 30, the clutch member 26 will be raised. The extension 38 of the slide bar 33 has one end of a coil spring 41 secured to it, the other end of said spring being secured to the frame member 5. This spring serves to return the slide bar and the cam plate 39 to normal position when pressure on the reset button is released. On the shaft 27 above the bracket plate 21 there is secured a collar 42 which is adapted to engage the lower end of a coil spring 43 inserted between said collar and the bevel gear 32. When the cam plate 39 is moved outward to release the end of the shaft 27, the spring 43 forces the shaft downward to bring the clutch members 25 and 26 into engagement again. The manner of resetting the indicators will be described later on. For convenience I will refer to the dial 8 and hand 10 as constituting a yard indicator, as the yard is the unit of measure which I prefer to employ in this machine. It will be obvious that as the hand 10 is adapted to continuously revolve around the dial, the yard indicator would not serve to indicate any measurement in excess of one yard, and other means must be provided to indicate the number of times the hand 10 has been moved over the dial and such means, which I will refer to as a "total yard indicator" together with the mechanism for operating the same, will now be described, referring particularly to Figures 1, 5, 6 and 9.

Secured to the inner side of the gear 17, on the opposite side to that to which the sleeve 18 is secured, is a pinion 44 which meshes with a gear 45 mounted on a stub shaft 46 and carrying a pinion 47 which meshes with a gear 48 which is fast on the end of a screw-threaded rod 49 mounted at one end for rotation in the partition 7 and at its other in a bracket plate 50 secured on the wall of an interior casing member 51. Secured at opposite ends in the partition 7 and the bracket plate 50, respectively, are two parallel rods 52, 53 located one over the other. Slidably mounted on and extending between these bars is a carriage 54 which is normally held against the end of a sleeve 55 mounted on one end of the upper bar 52, and constituting a stop, by means of a coil spring 56 one end of which is secured to said carriage and the other to the bracket plate 50. (Figure 5). The carriage 54 is in the form of a plate having end flanges 57 which contain the apertures by means of which the carriage is slidably mounted on the rods 52, 53, and slidably and pivotally mounted on the rod 53 between these flanges, and normally in engagement with the innermost, or that toward the left in Figure 5, is a slide block 58 (Figures 5 and 9) which, at its lower end, is provided with a curved recess 59 on its inner face which is provided with threads adapted to engage screwthreaded rod 49, so that when this rod is rotated the slide block will be moved in one direction or the other. The lower end of the slide block 58 is normally held in yielding engagement with the screwthreaded rod 49 by engagement of the rear side thereof by the lower end of a leaf spring 60, (Figures 6 and 9), the upper end of which is secured at 61 through a plate 62, to be presently referred to, to the back of carriage 54. The slide block 58 is adapted, when moved by the rotation of the rod 49, to cause the carriage 54 to move over rods 52 and 53 against the resistance of spring 56 to move one member of the total yards indicator. This total yards indicator comprises a disk 63 (Figures 1 and 8) provided with a spirally arranged series of numbers 64 beginning at the central portion of the disk and terminating at some point near the circumference thereof, and running in order from 0 to 100. The disk 63 is mounted on a circular metal plate 65 (Figure 5) which has secured to its under side a large gear wheel 66. Secured on the under side of gear wheel 66 is a sleeve 67, which is rotatably mounted on a stud 68, (shown by dotted lines in Figure 5), projecting upward from a bracket 69 secured at its inner end to the partition 7. Secured on the lower end of sleeve 67 is a heart-shaped cam 70 which also encircles the stud 68 and rests upon a collar 71 provided at the base of stud 68, and the purpose of which will presently appear. The gear 66 and plate 65 carrying the disk 63 are adapted to be rotated in the following manner:

Secured in a recess 72 (Figures 7 and 8) in the upper end of the partition 7, is a stud 73, the lower end of which is screwthreaded into the partition, as indicated at 74 in Figure 5. Rotatably mounted on the upper end of this stud and supported on a sleeve 75 surrounding the same, is a Geneva wheel 76 which has secured on its upper side a pinion 77 in mesh with the large gear wheel 66. Slidably mounted on the sleeve 30 (Figure 10) is a collar 78 having a circular groove 79 and having mounted on its upper end a disk 80 having secured on its under side a short arm 81 carrying a pin 82 adapted to engage in the usual slots 83 of the Geneva wheel in the rotation of disk 80. The disk 80 is adapted to rotate in close proximity to the curved faces 84 of the Geneva wheel and its periphery is recessed, as indicated at 85, to accommodate the pointed ends of the wheel containing the slots 83, in the usual manner. As the sleeve 30 rotates in unison with the measuring roller 11 and serves to rotate the hand 10, it will be seen that with each rotation of the hand the pin 82 will engage in one or the other of the slots 83 to turn the Geneva wheel 76 through a portion of a revolution, and this operates by engagement of the pinion 77 with the large gear 66 to turn the plate 65 and disk 63 a given distance to advance a number on said disk. This movement of disk 63 is made in co-operation with the continuous movement of a shutter having an opening, and the arrangement is such that the opening in the shutter will be caused to display a number until the hand 10 has passed beyond the seven-eighths yard indication, or last fractional division on the dial 8, at which time the pin 80 will engage in one of the slots 83 of the Geneva wheel 76 and begin to turn disk 63; and at the end of the movement of this disk, that is, when the pin 80 passes out of the slot of the Geneva wheel, when motion of the latter ceases, the opening in the shutter will be in position to display the next number in succession to the number previously displayed. This shutter comprises a plate 84ª which is integral with and a horizontal extension of the plate 62 (Figure 6) previously referred to, and which plate 84ª has an integral portion 85ª extending longitudinally of the machine from beyond the center of the disk 63 in one direction to the periphery thereof in the opposite direction, and is provided with an opening 86 which is of a size to display the separate numbers on the disk 63. When one number is being displayed through the opening 86, all the other numbers that could be seen through the window 3 (Figure 1) will be covered by the shutter 85. The slide block 58 being in contact with the screwthreaded rod 49 (Figure 5) and the latter being adapted to be continuously rotated by the chain of gears leading directly from the measuring roller 11, it follows that in the measuring operation the shutter 85 will be continuously moved in one direction (to the left in Figures 1 and 8) or in a radial direction from the center toward the periphery of the disk 63. The arrangement of the numbers on the disk 63 provides, as shown by Figures 1 and 8, a series of columns of figures radiating from the central portion of the disk 63, and the movement of the shutter 85 is such that with each movement of the disk 63 effected by the Geneva wheel 76, the opening 86 of the shutter will be in a position to disclose a new number on the disk, which will be framed, as it were, in the said opening. The relation of the pitch of the threads on the screwthreaded rod 49 to produce the proper movement of the shutter 85, relative to the movement of the disk 63, may be mathematically determined, but I find it convenient to simply provide a pitch of thread which will result in moving the shutter only a few thousandths of an inch for each revolution of the measuring roller, and then placing a plane disk under the opening in the shutter and calibrating it according to the movement of the shutter effected in each complete revolution of the hand 10 by the measuring roller. This, of course, only applies to a master disk, and thereafter the screwthreaded rods and disks will be made to conform to the relations established in the pattern machine.

One of the general objects of the invention is to provide means for returning the disk 63, shutter 85, and hand 10 to the zero position at the end of any measuring operation, or when the limit of the machine has been reached. The mechanism for effecting this resetting of the machine will now be described, referring particularly to Figures 5, 6, 7, 8 and 9.

Referring first to Figure 6, the slide bar 33 is provided within the frame member 5 with a right-angular extension or arm 87 to which is pivotally secured one end of a link 88, the other end of which is pivotally secured to a crank arm 89 having a sleeve 90 secured on the lower end of a rock shaft 91. This rock shaft is mounted at its lower end on a pin 92 adjustably secured in a socket member 93 by means of a screw 94, the socket member being mounted on the base plate 4. At its upper end the rock shaft is reduced in diameter and has a bearing in a socket member 95 secured on the under side of a plate 96 mounted on the frame member 5 and secured to the upper end of the partition 7, and which forms a support for the dial 8. Mounted near the upper end of the rock shaft 91 is a sleeve 97 secured on the rock shaft by a set screw 98 (Figure 6) and having an arm 99 extending inwardly therefrom which has a pointed projection 100 at its outer end which is adapted to co-operate with a heart-shaped cam 101 which is secured on the sleeve 30 below the collar 78. Between said collar and the cam 101 there is interposed a coil spring 102 for a purpose to be presently described. As thus far described, when the reset button 34 is pushed inward, the link 88 acts to partially rotate the rock shaft 91 through the medium of the crank arm 89 which acts to turn the arm 99 inward to bring its pointed end into engagement with the edge of the heart-shaped cam 101. Continued pressure on the button will cause the projection 100 to move the cam in one direction or the other, according as its point may be lying on one side or the other of the median line of the machine, and this movement continues until the pointed projection rests in the recess 103 at the base of the cam, at which point movement ceases. As the cam rotates, it, of course, turns the sleeve 30 and hand 10, and the cam is so positioned on the sleeve that when the projection 100 rests in the recess 103, the hand 10 will be at zero on the dial 8. The mechanism for returning the disk 63 to the zero position comprises the following parts:

Mounted on the rock shaft 91 above the sleeve 97 (Figure 5) is a similar sleeve 104 having a crank arm 105 thereon to which is pivotally secured at one end a connecting bar 106, the other end of which is secured to a lever arm 107 which is secured to the hub 108 (Figure 5) which is pivotally mounted on a stud 109 projecting upward from the bracket 69 previously referred to. The hub 108 has an arm 110 similar to the arm 99 previously referred to, said arm having a pointed end adapted to co-operate with the heart-shaped cam 70 mounted on the bottom of sleeve 67 which carries the gear 66 and plate 65 on which the disk 63 is mounted. Thus, when the reset button 34 is pushed inward, the connecting bar 106 will also be pushed inward by the action of the crank arm 105, and this movement of the connecting bar will serve to rock the hub 108, through the medium of the lever arm 107, and thereby move the outer end of arm 110 into engagement with the edge of the heart-shaped cam 70, which will act to turn said cam until the end of arm 110 rests in the recess at the base thereof, in a manner well known, and as previously described with reference to the cam 101. This turning of cam 70 operates to turn sleeve 67 and thereby to turn the disk 63 to the zero position. Before the disk 63 can be returned to the zero position in the manner described, however, it is necessary to move the disk 80 out of engagement with the Geneva wheel 76. This is accomplished in the following manner:

Pivotally mounted at 111 (Figures 5 and 6) in ears 112 bent inward from the frame member 5, is a plate 113 (Figure 8), the inner end of which is recessed, as indicated by dotted lines in Figure 8 at 114, to allow the end of the rod to engage in the recess 79 of the collar 78. Secured on the top of the plate 113 is a curved cam plate 115 which increases in thickness toward the inner end of the plate. Secured on the rock shaft 91 near the top thereof is a sleeve 116 which has projecting inward from it, an arm 117, the outer end of which is cammed or inclined, as indicated at 118 in Figure 5, to engage and slide over the upper surface of the cam plate 115. The disk 80 is secured to the top of the grooved collar 78 and hence when the reset button is pushed inward to partially rotate rock shaft 91, the cam end 118 of arm 117 will engage the cam plate 115 to cause the outer end of the plate 113 to be depressed. This acts to move the collar 78 downward on the sleeve 30 against resistance of spring 102, thus lowering disk 80 below the plane of the Geneva wheel 76, so that the latter is free to be turned by the gear 66 and pinion 77 in the resetting of disk 63 by the means above described. The mechanism for returning the shutter 85 to the zero position comprises the following parts:

Projecting inward from the top of the slide block 58 (Figures 5 and 9) is an arm 119. Pivotally mounted at its ends in the bracket plate 50 and partition 7, respectively, is a bow-shaped rod 120, which is located immediately above and in contact with the arm 119. The bow-shaped member 120 may be termed a "cam rod", and upon being turned, acts to depress the arm 119 and thereby turn the slide block 58 out of engagement with the screw-threaded rod 49. To effect this operation, the inner end of the cam rod 120 projects through the partition 7 (Figure 5) and has secured on its end a rock arm 121. Mounted on the connecting bar 106 is a cam plate 122 (Figures 6 and 7), which is adapted to engage the upper end of the rock arm 121 to move it outward when the connecting bar is moved inward by turning the rock shaft 91 by pressing in with the reset button. As this rock arm is so moved, it turns the cam rod 120 to depress the arm 119 and turn the slide block 58 out of engagement with the screw-threaded rod 49. When this occurs, the spring 56, previously referred to as connected to the carriage 54, operates to pull said carriage with the slide block 58 to the right in Figure 5 and to the left in Figure 6 until the carriage engages the sleeve or stop 55, which determines the zero position of the shutter, which is mounted on the carriage through the medium of the plate 62, which is an integral portion of the shutter.

Thus, from the foregoing description, it will be seen that in one inward movement of the slide bar 33, effected by pushing inward the reset button 45, the clutch member 26 will be raised out of engagement with the clutch member 25, the disk 80 will be lowered below the plane of the Geneva wheel 76, the cam 101 will be turned to move the hand 10 to zero, the cam 70 will be turned to move the disk 63 to zero, and the slide block 58 will be turned out of engagement with the screwthreaded rod 49 to permit the shutter 85 to be moved to the zero position by the spring 56. Upon release of the reset button, the spring 41 returns the slide bar 33 to normal position, the spring 43 returns the clutch member 26 to engagement with the clutch member 25, and the spring 102 raises the disk 80 to the plane of the Geneva wheel 76. The upward movement of disk 80 is arrested by a collar 123 secured on the sleeve 30. A brief description of certain parts necessary to the operation of the complete machine, but which are not involved directly in the invention will now be given.

Referring to Figure 2, the numeral 124 indicates a knife lever, which is operated by a button 125 on the end thereof projecting through a slot 126 in the casing, and which is normally held in a raised position by a coil spring 127 secured at one end to the knife lever and at its other, to an arm 128 secured on the frame member 5. This knife lever carries a blade 129, which, upon being depressed, operates to notch the fabric at the edge to indicate the termination of the measured portion of the fabric. Pivotally mounted in the frame of the machine above the measuring roller 11 is a presser roller 130 (Figures 2 and 3). This presser roller is rotatably mounted in a pivotally mounted frame 131, having a projecting arm 132 (Figure 3), which is normally engaged by a spring-controlled starting lever 133 (Figure 2) to hold the roller 130 in an elevated position. When the lever 133 is pressed inward out of engagement with the arm 132, a spring 134 operates to turn the frame downward to bring the roller 130 into contact with the measuring roller 11.

These parts are of well known construction and are embodied in various prior patents of this and other inventors in the same interest, and are only referred to for the purpose of making the general operation of the machine understandable.

It is sufficient to state, therefore, that with a piece of fabric inserted between the rollers 11 and 130, and the roller lowered, when the fabric is pulled between the rollers, the measuring roller 11 will be rotated, and through the chain of gearing described, will operate the hand 10, disk 63 and shutter 85. At the end of the measuring operation, or when the capacity of the machine, namely, one hundred yards, has been reached, the hand, disk and shutter are returned to the zero position by pressing in the reset button as above fully described.

I claim:

1. In a fabric measuring machine comprising a yard indicator, and mechanism for continuously moving the same by the passage of the goods through the machine, a total yards indicator comprising two co-operating superimposed elements, one of which is continuously moved by said mechanism, to successively display numbers disposed on the other, and means carried by said mechanism for moving the other element in stages corresponding to cycles of movement of the yard indicator.

2. In a fabric measuring machine comprising a yard indicator, gearing for continuously operating the same, and means for continuously operating said gearing by passing the goods through the machine, a total yards indicator comprising two co-operating superimposed elements, one of which has numbers thereon to indicate yard measurements, means operated by said gearing for producing a continuous lateral movement of one of said elements relatively to the other in the measuring operation, and means operated by said gearing for producing a movement in stages of the other element corresponding to cycles of movement of the yard indicator, and correlated to the movement of said shutter.

3. In a fabric measuring machine comprising a yard indicator, and gearing operating to continuously move said indicator and adapted to be actuated by the passing of the goods through the machine, a total yards indicator comprising a movable disk having numbers thereon indicating yard measurements and a shutter co-operating therewith, means for continuously moving said shutter from said gearing, and means operated by said gearing for advancing said disk in stages corresponding to cycles of movement of the yard indicator.

4. In a fabric measuring machine comprising a yard indicator, gearing for operating the same, and means for continuously operating said gearing by passing the goods through the machine, a total yards indicator comprising a disk having a spirally arranged series of numbers thereon indicating yard measurements, a shutter co-operating therewith, means operated by said gearing for continuously moving the shutter in one direction relative to said disk, and means operated by said gearing for rotating said disk in stages corresponding to cycles of movement of said yard indicator.

5. In a fabric measuring machine comprising a yard indicator, gearing for operating the same, and means for continuously operating said gearing by passing the goods through the machine, a screw-threaded rod adapted to be continuously operated by said gearing, a total yards indicator comprising a disk having a spirally arranged series of numbers thereon indicating yard measurements, means operated by said gearing for rotating said disk in stages corresponding to cycles of movement of the yard indicator, a shutter co-operating with said disk, and means carried by the shutter for engaging said screw-threaded rod, whereby said shutter is continuously moved in one direction relative to said disk, and the two movements co-operating to display in succession numbers on said disk representing the number of cycles of movement of the yard indicator.

In testimony whereof, I have hereunto set my hand.

JOHN L. WHEELER.